4 Sheets--Sheet 4.
B. G. FITZHUGH.
Cart-Loading Apparatus.
No. 137,768. Patented April 15, 1873.
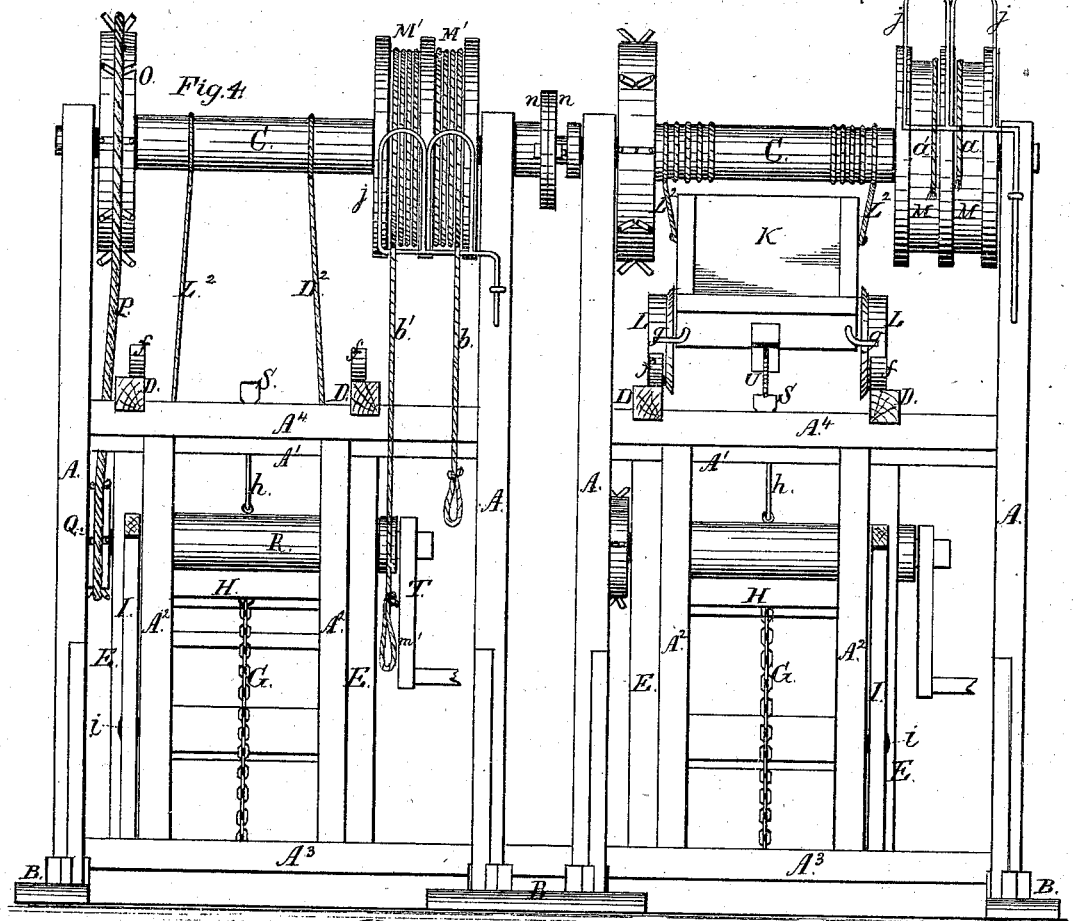
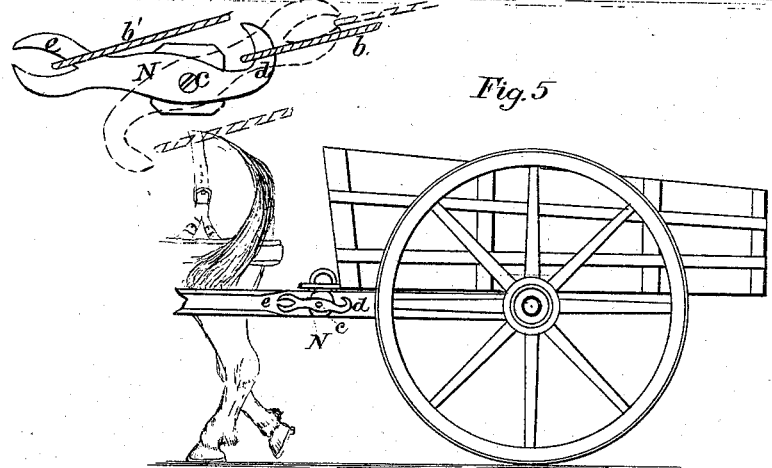
Witnesses:
J. West Wagner,
Augustus H. Girard.
Inventor:
Benjamin G. Fitzhugh
By Johnson Klaucke & Co
his Attorneys.

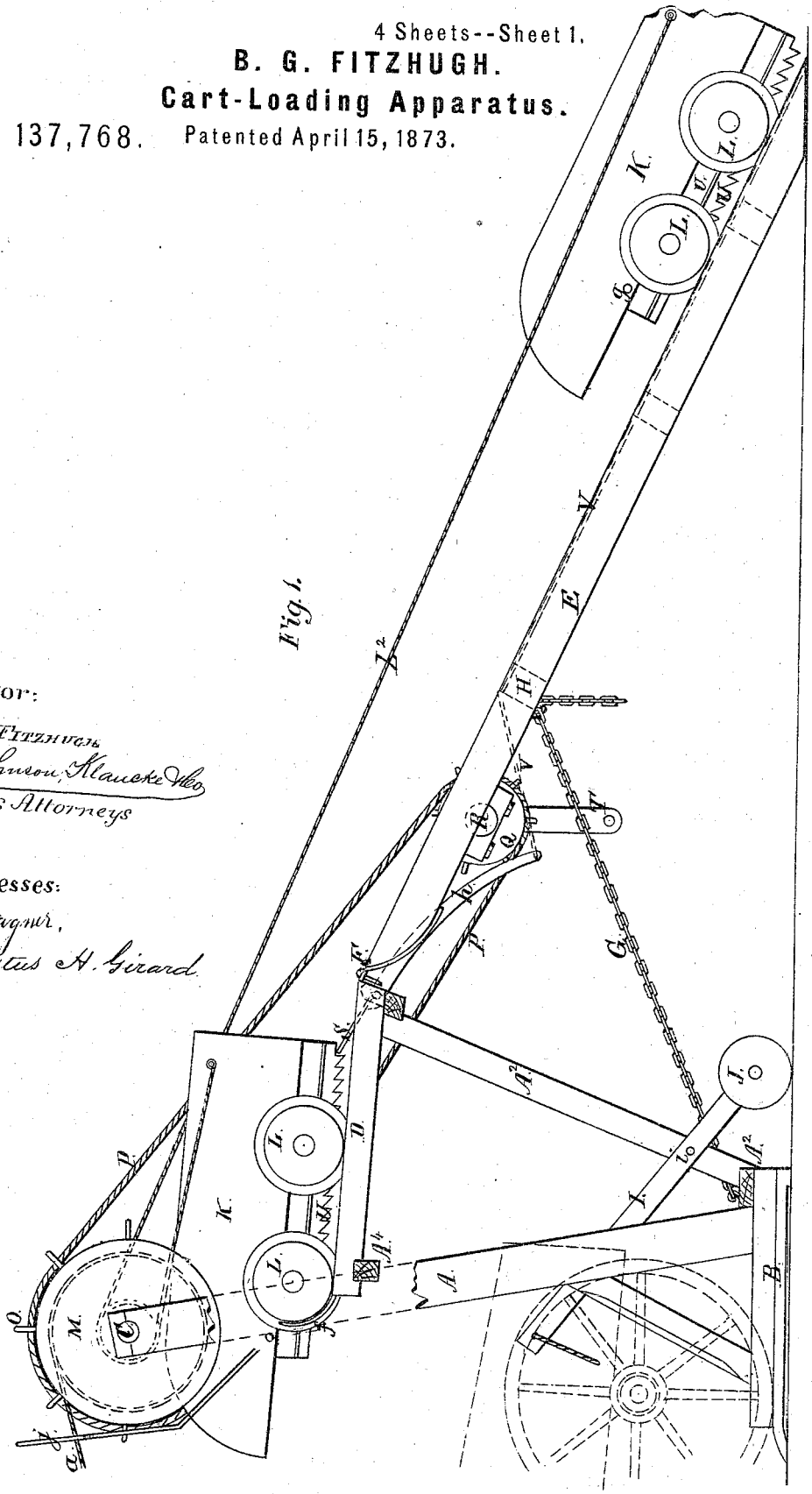

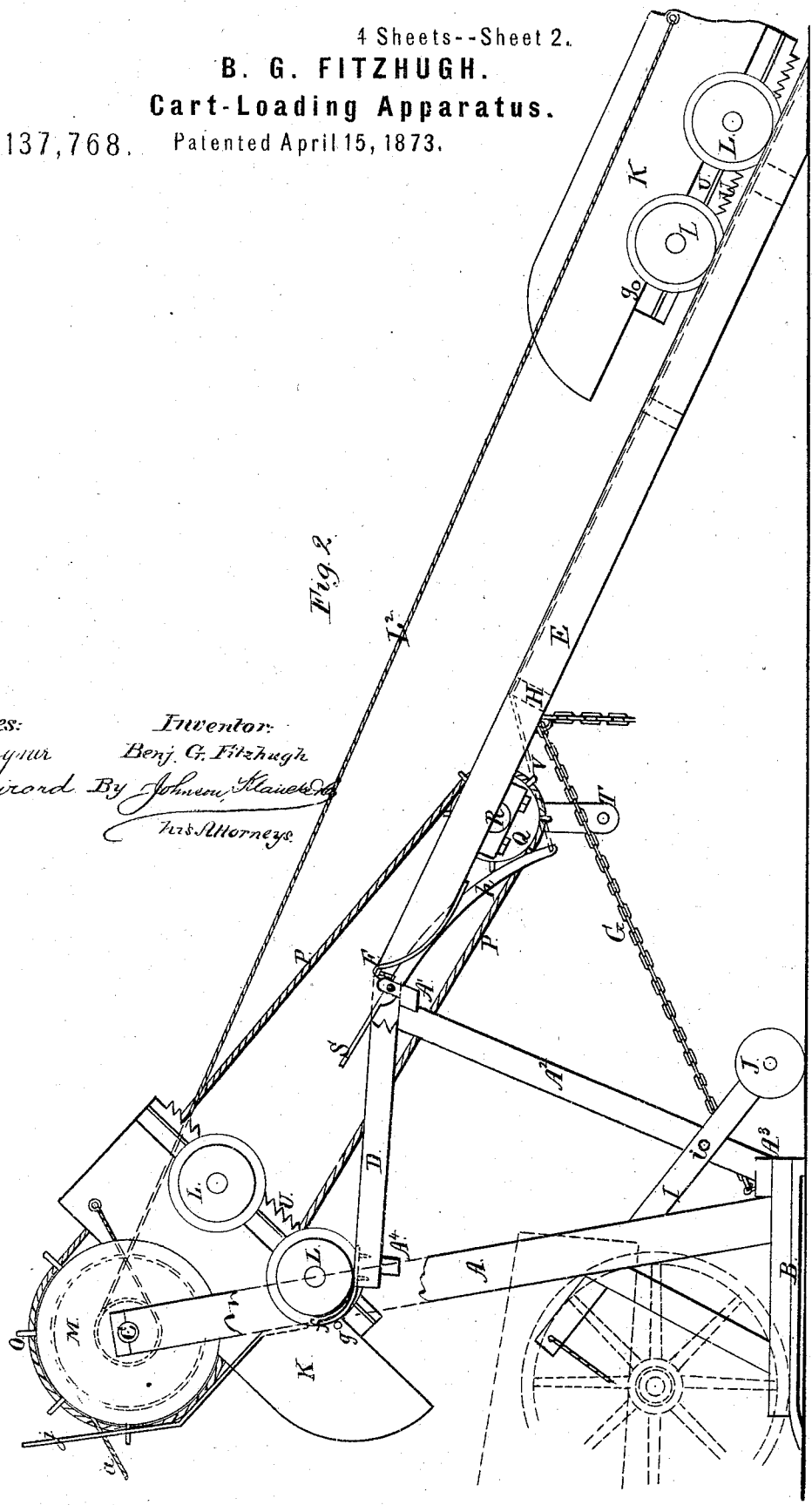

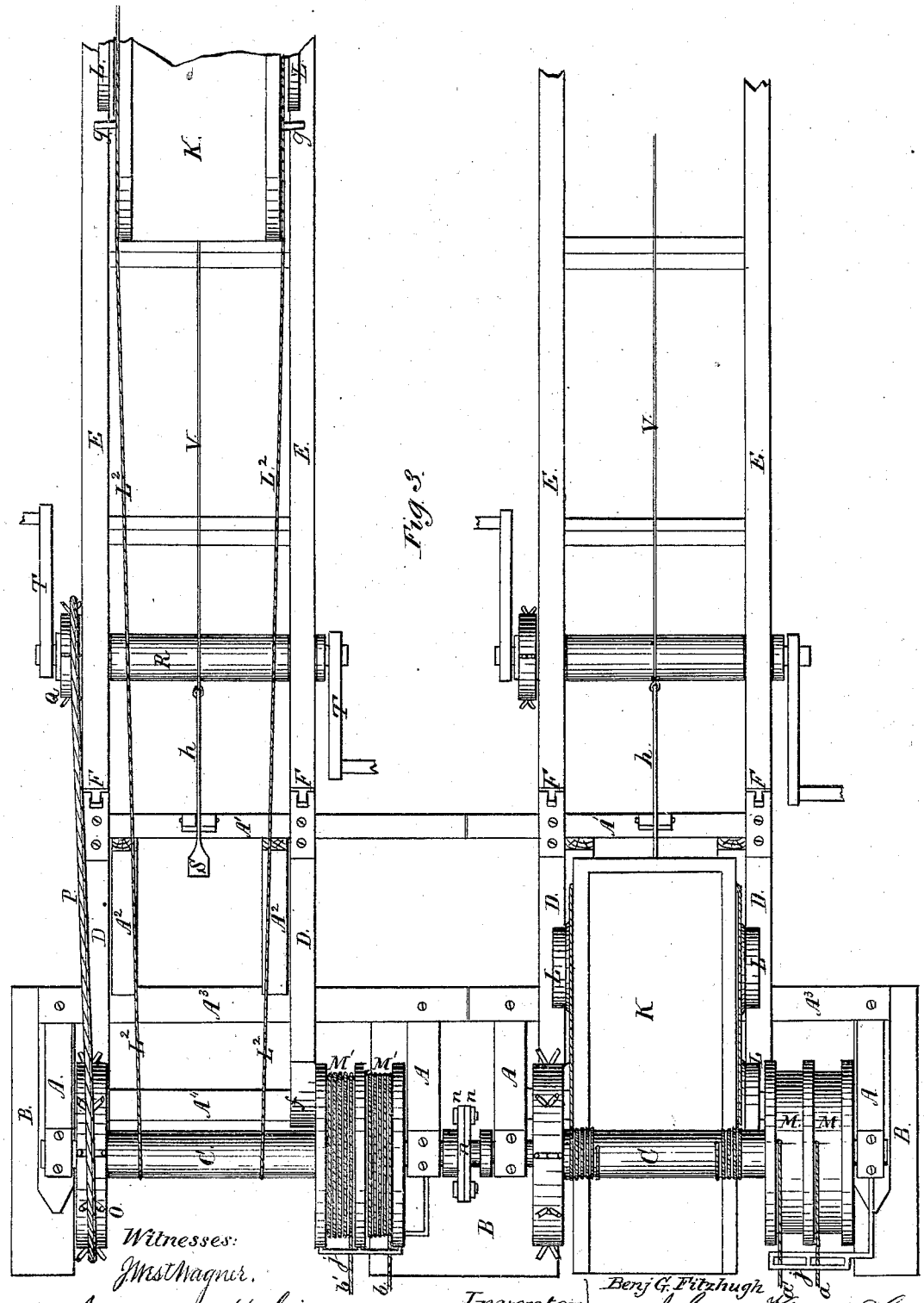

UNITED STATES PATENT OFFICE.

BENJAMIN G. FITZHUGH, OF FREDERICK, MARYLAND.

IMPROVEMENT IN CART-LOADING APPARATUS.

Specification forming part of Letters Patent No. 137,768, dated April 15, 1873; application filed September 7, 1872.

*To all whom it may concern:*

Be it known that I, BENJAMIN G. FITZHUGH, of the city and county of Frederick, in the State of Maryland, have invented certain new and useful Improvements in Cart-Loading Apparatus, of which the following is a specification:

My invention relates to apparatus or machines for loading carts in making excavation of any description, for the removal of earth and other material; and the invention which forms the subject-matter of this patent consists, first, in the construction and arrangement of the operating parts of a cart-loading apparatus, whereby the force of the horse of the loaded cart moving away from the machine is employed to automatically bring into position alternately upon railways loaded cars to be dumped; second, in means for automatically disconnecting at the proper time the loaded cart from the devices which it operates to bring into position the loaded cars for being dumped; third, in the combination and arrangement of a double track with its separate cars and winding and unwinding pulleys, whereby the connection of the cords from said pulleys with the cart being loaded will cause a loaded car to ascend and an empty one to descend as the loaded cart is moving away; fourth, in the combination and arrangement of the hinged or knee joints of the fixed and adjustable sections of the tracks and the bracing-chain, whereby the entire frame is braced so that it cannot be turned over by the weight of the ascending car, while it also allows the car-rails to be adjusted to suit the surface of the ground, and maintain always an angle with the fixed portion of the tracks; fifth, in combining with the frame a hinged pawl or detent, so as to catch into a rack upon the under side of the loaded car, the object of which is to detain or hold the loaded car upon the fixed section of the rails while being moved in position to be dumped, and thus prevent the accidental slipping back of the car when the pulling-cord is released; sixth, in providing the track at its forward terminus and the car with devices which will automatically interlock and hold the car in position while in the act of dumping; seventh, in the combination with an operating pulley-shaft of a fixed section of railway, arranged in such relation to each other that the car while being dumped will be held in position by the shaft; eighth, in connecting the cords from the operating-shaft to the rear end of the car in a manner to accomplish automatically the dumping of the car by the continued turning of the operating-shaft after the car has reached the terminus of the track, and to allow it to be lowered again in position upon the track for descent thereon; and my said improvement further consists of an organized cart-loading machine having its several parts constructed and arranged for joint operation as will be more fully hereinafter described.

In the accompanying drawing, Figure 1 represents an elevation of a cart-loading machine embracing my invention, a loaded car being shown in position to be dumped and an empty one to be filled. Fig. 2 represents a similar view, showing the filled car in the position when dumping its load into a cart. Fig. 3 represents a plan or top view of the machine. Fig. 4 represents a front elevation of the same. Fig. 5 represents an elevation of the cart, showing the automatic detaching device which connects with the cords of the operating-pulleys of the machine; and Fig. 6, an enlarged view of the cart-detaching device, showing its attachment to the pulling and detaching cords of the operating shaft.

The machine consists of a portable frame, A, placed upon sill-boards B, and supporting at its top an operating pulley-shaft, C, in suitable bearings, and beneath the same a section of railway, D, extending from its rear side, and having additional supports in a horizontal bar, A¹, resting on rearward-inclined struts A² rising from the bottom rail A³, the front ends of said railway being secured to a timber, A⁴, which braces the main uprights A; and the latter inclines slightly forward to allow room for the cart to back against or between the frame A to receive the load from the dumped car above, as shown in Fig. 2 of the drawing. This section D of the railway is nearly horizontal, and upon it the loaded cars are brought up to be dumped by a section of railway, E, hinged to the fixed section D just outside of the struts A², in order to allow them to be adjusted with respect to the fixed section D to suit the surface of the ground, and form a knee bracing-joint, F, to the main frame. A taut chain, G, fastened to the sill A³, extends upward, and is secured to a cross-piece, H, of the hinged section E, the design of which is to brace the two railway sections together, and prevent the main frame from being tipped or turned over rearward under the load of the car while being brought into position to be dumped; the design being, however, to maintain the two sections of railway at an angle to each other to accomplish the bracing function of the chain. The frame, with its track or tracks thus constructed and arranged parallel to each other, is rendered portable by means of levers I, pivoted at $i$ to the struts A², and provided with small wheels J, which are made to bear upon the ground when the levers I are raised, and held up by a hook or other means to raise and support the frame from the ground, so that it can be moved from place to place. The cars K are provided with truck-wheel L, fitted to run upon the tracks D E; and they are connected to the operating shaft or shafts C by means of ropes L², one on each side of the car, the connection thereof being made to the latter in the rear of the truck-wheels L, for a purpose to be presently described. These ropes L are connected to the operating-shaft C, so as to be wound thereon, those from one car from the under side and those from the other car from the upper side of said shaft, so as to effect the drawing up of a loaded car and the descent of an empty one simultaneously with the turning of the shaft, while the reverse motion thereof alternates these movements of the filled and empty cars, as shown more clearly in Figs. 1 and 3 of the drawing. The shaft C is provided with sets of flanged pulleys M M M' M', to which are secured double ropes $a$ $a'$ and $b$ $b'$, one set, $a$ $a'$, being arranged to wind, while the other, $b$ $b'$, is unwinding, and vice versa, during the operation of loading separate carts by separate cars. This movement of the cars is effected by securing the wound-up ropes $a$ $a'$ to the cart being filled, so that as the filled cart is moving away from the machine the ropes $a$ $a'$ will be unwound from their pulleys M, and leave the emptied car free to descend its track, while the ropes $b$ $b'$ will correspondingly wind upon their pulleys M' M' and draw up the loaded car. This is done as each loaded cart is driven away from the machine. The ropes $a$ $a'$ and $b$ $b'$ must, however, be of unequal length, with their long and short ends hooked over a device secured to the cart, which will automatically detach itself therefrom when a loaded car has been drawn upon the fixed section D of the railway. For this purpose the ropes $a$ $b$ of the pulleys M' M' are made the shortest, and serve as the operating-ropes to draw the cars in the positions stated by the movement of the filled carts. When, however, the short rope $a$ or $b$ has reached its limits with the movement of the cart, the longer rope $a'$ or $b'$ is brought into action by the same movement of the filled cart and turns over the device to which both ropes are hooked, and thus detaches and liberates both ropes $a$ $a'$ or $b$ $b'$, as the case may be, from the cart, and leaves them free to be again wound upon their respective pulleys. This drawing and detaching device consists of a hooked lever or cam, N, pivoted nearer one end than the other to the shafts of the cart, as shown in Figs. 3 and 6. The end nearest the pivot $c$ is the draft-hooked end $d$ for the short rope $a$ or $b$, and the long end is a forked hook, $e$, for the long rope $a'$ or $b'$. The hook $d$ of the short end will hold the pivoted lever N in a horizontal position so long as the short rope $a$ or $b$ is drawing the loaded car upon the fixed section D of the railway E; but when this is done, the longer rope $a'$ or $b'$ comes into action as the loaded cart is moving away, and draws the long end $e$ of the pivoted lever N up and turns it over, and thus disconnects, automatically, both ropes at the same time. This drawing and detaching device N is shown in Fig. 5 as applied to the shafts of the cart, and in the enlarged view in Fig. 6 it is shown by dotted lines as turned over to release the operating-ropes. Each cart is, of course, provided with this device, or its equivalent, and the ropes $a$ $a'$ or $b$ $b'$ are applied to it, having loops $m$ $m'$ for that purpose, while the cart is being filled, so as to be ready to operate the cars as the cart is moving away from the machine. The cart, while being loaded, is backed upon the sill-pieces B, with the body between the frame-supports A, so that the cars readily dump their loads therein from the end of the fixed rail-tracks D, as shown in Fig. 2. The operating mechanism thus described is designed to place the filled car upon the fixed track D, but not to effect the dumping. This is accomplished, automatically, by separate devices. The end of the operating-shaft C is provided with a sprocket-wheel, O, from which passes a rope, P, around a sprocket-wheel, Q, on the end of a crank-shaft, R, secrued in bearings upon the under side of the hinged railway section E of the railway.

The filled car having been drawn, as described, upon the fixed section D, and there left by the power of the filled cart moving away, it is held in that position temporarily by means of a detent, S, pivoted to the cross-beam A¹ of the rear struts A² of the frame, so that its upper end will automatically catch into a rack, U, secured to the under side of the car K, and thus hold the filled car from descending, while the attendant lays hold of the crank-handle T and continues to revolve the operating-shaft C, which brings the car to the end of the track. At this point it is arrested by the front wheels coming in contact with upward-curved projections $f$, which brings the car beneath the transverse operating-shaft C, the front ends of the car being rounded for that purpose. In this position the operating-ropes L² are inclined from the shaft C to the rear end of the car K, and the continued turning of the crank-handle T draws the rear end of the car up to the shaft C so that its top rests against it, as shown in Fig. 2, and thus dumps its load into the cart below. By this arrangement the operating-shaft C forms a stop to prevent the car from pitching over, while it is held from moving back in dumping by two arms, $g$, projecting from the sides of the car so as to pass over and interlock with the curved projections $f$ of the track. After the contents are dumped the car is brought back upon the track by its weight freeing itself from the holding-pins $g$, and descends by the unwinding of its connecting-ropes $L^1$, which is automatically effected by the passing away of the filled car, while at the same time the other filled car is brought up by the same power in position to be dumped in like manner. In this way the operation is carried on, one car being dumped as another is being filled. In the descent of the car the detent S is held out of the way by pulling a cord, V, attached to its rear end $h$, which hangs down, so as to raise it and depress its front end out of the way of the car-rack.

When one pair of ropes is wound upon their pulleys so as to leave a sufficient portion unwound for attachment to the cart being filled, as shown in Fig. 4, the other pair will be unwound from the other pulleys, at which point the detachment from the cart will be effected, as described. These operating-ropes are held upon their respective pulleys by means of guides $j$, secured to the frame A in front of said pulleys.

It is sometimes convenient to use a single machine. The action of the car is not then automatic. For this reason, and in order to operate it successfully, I provide each machine or section of track with a crank-shaft and sprocket-wheel, and connect the crank-shaft wheel with a sprocket-wheel on the operating-shaft. The operation is then obvious: By turning the crank or cranks in the proper direction the car K will ascend the inclined track, and when it reaches the operating-shaft will dump its contents, after which it will descend by its weight, the detent S having been first depressed out of the way of the car-rack.

Two separate machines may be united together so as to make a double machine by providing the end of each operating-shaft with the disk $n$, which may be brought together and united by screw-bolts, so as to unite the two shafts in a continuous one, in which case the crank-shaft of only one section of the tracks is used, as shown in the drawing.

Having described my invention, I claim—

1. In a cart-loading apparatus in which the loading cars are arranged and operated alternately upon inclined railway tracks, a loaded cart connected, as described, to the operating mechanism, to raise and lower at the same time the loaded and empty car by the motion of the horse away from the loader.

2. In a cart-loading apparatus, the combination and arrangement of double railway tracks with their separate cars, winding and unwinding shaft C, and winding and unwinding pulleys M M', when the latter are arranged to be operated by a single connecting-shaft, and by the movement of a loaded cart, essentially as described.

3. The detaching device of the cart, in combination with a long and a short rope, $a\ a'\ b\ b'$, of the winding and unwinding shaft C of the loader, essentially as and for the purpose described.

4. In a cart-loading apparatus, the combination and arrangement of the hinged adjustable sections E of the railway tracks with the fixed sections D and the bracing-chains G, essentially as and for the purpose herein described.

5. The detent S of the fixed section D of the frame, in combination with a rack, U, on the car, to automatically lock and hold the car after being brought to a position to be dumped by hand, essentially as described.

6. The combination of the curved stop $f$ at the forward terminus of the rails with the pins or catches $g$ of the car, automatically interlocking to hold the car in position while in the act of dumping, essentially as described.

7. In combination with the railways and the cars elevated thereon, as described, by the pulley-ropes, the crank-shaft connected by sprocket wheels and belt with the operating-shaft, for dumping the loaded car by hand and leaving it in position to descend by its weight, as described.

8. In combination with a railway track and a dumping-car, operated as described, the arrangement of the operating-shaft C to form a stop for the car, and hold it to the track while dumping, substantially as described.

9. The ropes $L^2$ of the operating-shaft C, connected with the car at the top thereof, and in the rear of the truck-wheels L, to operate in connection with the shaft C to dump the car when arrested, as described.

10. The two separate hand-operating loading-machines, constructed as described, united together to form a double loading-machine, by means of the disks $n$ on the operating-shafts, as described.

11. The cart-loading apparatus having its several parts constructed and arranged for joint operation substantially as herein set forth and shown in the drawing.

In testimony whereof I have hereunto set my hand this 9th day of August, A. D. 1872.

B. G. FITZHUGH.

Witnesses:
A. E. H. JOHNSON,
J. W. HAMILTON JOHNSON.